United States Patent [19]
Polydoris et al.

[11] 3,835,543
[45] Sept. 17, 1974

[54] MEASURING INSTRUMENT
[75] Inventors: Nicholas G. Polydoris, Kenilworth;
    Burnell J. Wollar, Barrington, both of Ill.
[73] Assignee: ENM Company, Chicago, Ill.
[22] Filed: Nov. 30, 1973
[21] Appl. No.: 420,525

Related U.S. Application Data
[63] Continuation-in-part of Ser. No. 196,358, Nov. 8, 1971, Pat. No. 3,791,038.

[52] U.S. Cl. ............................................. 33/141 E
[51] Int. Cl. ............................................. G01b 3/12
[58] Field of Search ............................... 33/141, 125

[56]        References Cited
            UNITED STATES PATENTS
1,718,052   6/1929   Lineaweaver .................... 33/141 R
            FOREIGN PATENTS OR APPLICATIONS
584,893     9/1933   Germany ........................... 33/141 R
347,643     8/1960   Switzerland ....................... 33/141 R Primary Examiner—Harry N. Haroian
Attorney, Agent, or Firm—Anthony S. Zummer

[57]            ABSTRACT

A measuring instrument for measuring linear distance on a surface by rolling a wheel on the surface along the linear distance to be measured. The wheel is mounted in a housing. The wheel is drivingly connected to a counter, which indicates the distance which the wheel has rolled. The counter is calibrated to indicate linear measurement in a selected system of measurement. A fastener is mounted in the housing. A collapsible handle is releasably connected to the fastener for manipulating the measuring instrument. The handle may be selectively removed from the instrument for convenient storage and handling.

4 Claims, 7 Drawing Figures

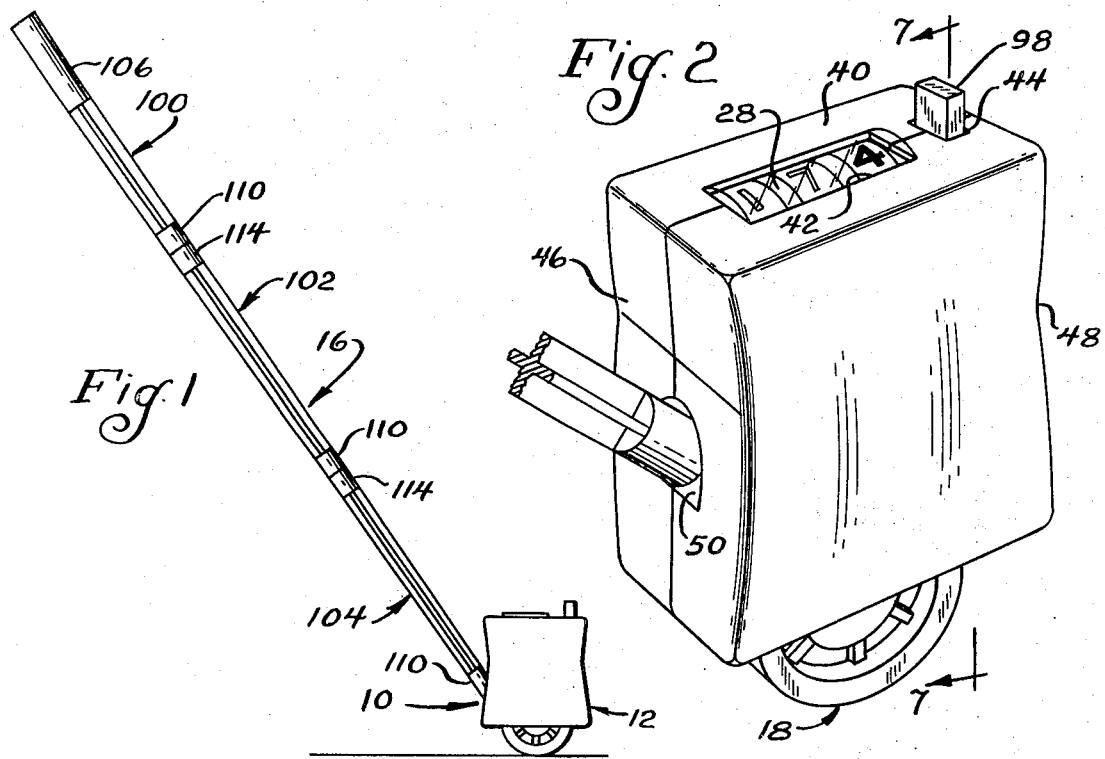
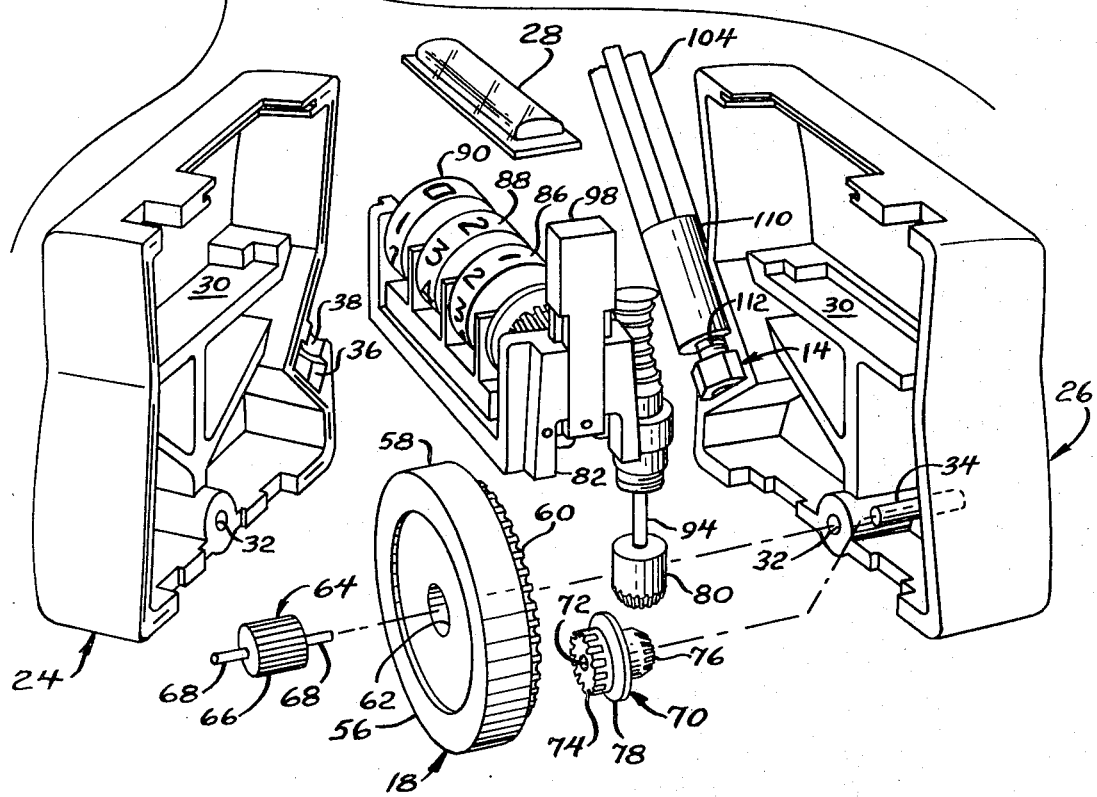

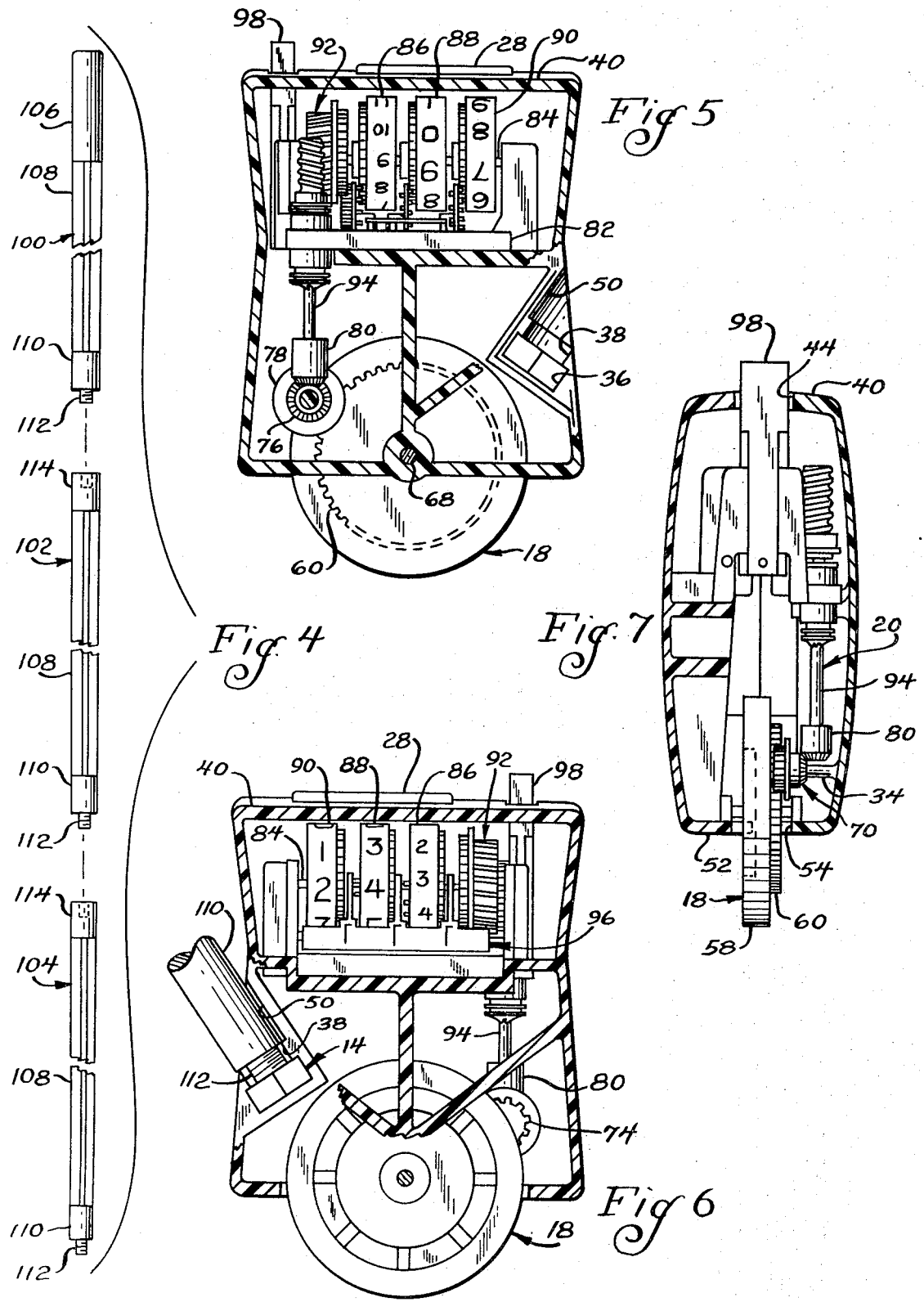

MEASURING INSTRUMENT

CROSS-REFERENCE TO RELATED APPLICATION

This invention is a continuation-in-part of the applicants' co-pending application, Ser. No. 196,358, filed Nov. 8, 1971, entitled MEASURING INSTRUMENT, now U.S. Pat. No. 3,791,038.

BACKGROUND OF THE INVENTION

It is often necessary to measure linear distances for various and sundry purposes. The customary measuring devices are calibrated sticks, such as rulers, yardsticks, or folding rulers, or flexible devices, such as tape measures or steel tapes which may be wound up. The sticks, though accurate, are cumbersome; and they are not convenient for carrying in a business suit. The tape measures are also accurate; but they cannot be used conveniently by a single person. Furthermore, irrespective of whether a stick or a tape is used, there is a limitation on the length which may be conveniently measured. Thus, either marks must be used or some method of marking opposite ends of the tape or stick is needed when the measurement to be made exceeds the length of the measuring instrument. In the applicants' co-pending application, an improved measuring instrument is provided in which the measuring instrument includes a visual indication of the distance measured. The distance measured can be effectively infinite simply by counting the number of times the visual indicator goes back to zero. It has been found that the measuring instrument in the co-pending application has found great use in measuring floor lengths or distances along the ground.

SUMMARY OF THE INVENTION

The present invention provides an instrument for measuring linear distances on a surface, in which the operator of the measuring instrument may stand erect and simply walk along a surface and make a measurement. The specific improvement herein includes a handle, which may be readily and conveniently attached to the applicants' measuring instrument. The construction of the applicants' measuring instrument is such that a fastening device is conveniently and easily built into the housing of a measuring instrument for readily attaching and detaching a handle, which handle may be collapsed to a short length for convenient carrying or storage.

It is therefore a principal object of the present invention to provide an inexpensive, lightweight measuring instrument which may be used for conveniently measuring linear distances by an operator utilizing a handle to manipulate the measuring instrument; but which handle may be quickly and easily removed from the instrument.

It is another object of this invention to provide an improved construction of a measuring instrument, wherein a fastening device is built into a housing for the measuring instrument for receipt of a handle.

Other objects and uses of the present invention will become readily apparent to those skilled in the art upon perusal of the following specification in light of the accompanying drawings.

BRIEF DESCRIPTION OF THE DRAWINGS

FIG. 1 is a side elevational view of a measuring instrument embodying the herein-disclosed invention, shown on a surface to be measured, with its handle extending outward from the housing at an angle of approximately 55° between the handle and the surface;

FIG. 2 is an enlarged perspective view of the measuring instrument of FIG. 1, with a portion of the handle broken away;

FIG. 3 is a perspective exploded view of the measuring instrument of FIG. 2;

FIG. 4 is an exploded view of the handle of the measuring instrument shown in FIG. 1;

FIG. 5 is a cross-sectional view taken through the housing of the measuring instrument of FIG. 2 in one direction;

FIG. 6 is a cross-sectional view taken through the instrument of FIG. 2, but taken in the opposite direction to that of FIG. 5; and FIG. 7 is a cross-sectional view taken on Line 7—7 of FIG. 2.

DESCRIPTION OF THE PREFERRED EMBODIMENT

Referring now to the drawings, and especially to FIG. 1, a measuring instrument generally indicated by numeral 10 is shown therein. The measuring instrument 10 generally includes a housing 12; a fastener 14 non-rotatably positioned in the housing; a handle 16 connected to the fastener; a measuring wheel 18 rotatably mounted in the housing; a drive 20 connected to wheel 18; and a resettable wheel counter 22 mounted within the housing 12 and connected to the drive 20.

Looking now to FIG. 3, which is an exploded view of the instrument 10, it may be seen that the housing 12 generally includes a plastic molded front half 24 and a plastic molded rear half 26. The two halves have surfaces for abutting against each other to form the enclosed housing. A transparent window 28 is mounted between the halves. The halves 24 and 26 are virtual mirror images of each other. Each half includes a counter shelf 30 for supporting the counter 22. Adjacent to the lower portion of each half, there is a wheel axle aperture 32. The rear half includes a gear shaft 34, which is formed integral therewith and supports a portion of drive 20. Each half includes a fastener recess 36, with a handle aperture 38 opening into the fastener recess. When the halves are joined, the fastener recess 36 in each of the halves forms a single recess which mateably receives the fastener 14, as will be described in detail hereinafter. The handle aperture 38 opens into the recess and provides an aperture for receipt of a portion of the handle 16.

The assembled halves 24 and 26 define a top 40, which has a window aperture 42 formed therein. The window 28 is mounted in the aperture to provide visibility of a portion of the counter 22. A reset button aperture 44 is also formed in the top 40. The housing 12 has a pair of opposed ends 46 and 48, which are substantially identical to each other. The ends 46 and 48 are generally concave in that there is a narrow portion of the housing between the top and bottom of the housing, as may be best seen in FIGS. 2, 5, and 6. This particular construction allows for easy holding of the instrument even under adverse conditions. The end 46 has a handle recess 50 formed therein for receipt of the handle 16. The handle aperture 38 opens into recess 50.

The housing also includes a bottom 52, which has a wheel opening 54 formed therein. The openings 32 in the interior of the housing are, in this instance, positioned exactly one inch from each of the opposite edges of the bottom, for reasons which will become apparent hereinafter.

The wheel 18, which is a molded plastic part, has a main body 56. The main body has a serrated outer periphery 58. The circumference of the outer periphery is, in this instance, exactly four inches. A spur gear 60 is molded integral with the main body; and the spur gear is drivingly connected to the drive 20. The main body 56 has an axle opening 62 in its center. An axle 64 is positioned in the axle opening 62. The axle includes a hub 66, which snugly mates with the opening 62. A pair of outwardly-extending shafts 68 are formed integral with the hub 66 and are rotatably positioned in the openings 32 to allow free rotation of the wheel relative to the housing.

The drive 20 includes a unitary molded plastic transfer wheel 70, having a shaft aperture 72 for rotatably positioning the transfer wheel 70 on the shaft 34. Formed integral with one end of the transfer wheel is a molded drive spur gear 74, which mates with the spur gear 60. A molded bevel gear 76 is formed integral with the other end of the transfer wheel. A disc 78 is formed integral with the gear 74 and the bevel gear 76. The disc 78 has a diameter substantially greater than either of the two gears 74 and 76 to prevent the transfer wheel from moving too far toward the wheel 18. A molded plastic shaft bevel gear 80 meshes with the bevel gear 76. The bevel gear 80 is connected to the counter 22 to drive the counter.

The counter 22 includes a frame 82 secured to the counter shelf 30. A wheel shaft 84 is mounted on the frame; and three counter number wheels 86, 88 and 90 are rotatably mounted on the shaft 84. The number wheels 88 and 90 have digits zero through nine, consecutively, thereon, while wheel 86 has digits zero through eleven, consecutively, thereon. The wheel 86 is connected to a conventional wheel drive mechanism 92, which is driven by a drive shaft 94. The drive shaft 94 has the bevel gear 80 fixed thereon.

The number wheel 90 is intermittently drivingly connected to the number wheel 88 through a conventional and well-known transfer wheel arrangement, whereby one complete revolution of wheel 88 rotates number wheel 90 one-tenth of a revolution. In like manner, the number wheel 86 rotates the wheel 88 one-tenth of a revolution for each complete revolution of the wheel 86. The number wheels 86, 88 and 90 are connected to a conventional reset mechanism 96, which has a reset button 98 extending through the reset button aperture 44. Depression of the reset button 98 resets the number wheels 86, 88 and 90 to zero.

The counter and wheel are calibrated to each other so that, for every three complete revolutions of wheel 18, the number wheel 86 makes one complete revolution. Inasmuch as the number wheel 18 has a circumference of four inches and the number wheel 86 has numerals zero through eleven, the number of inches traversed by the wheel is indicated on the counter. Each time the wheel 86 makes one complete revolution, the wheel 88 is moved one-tenth of its rotation, thereby indicating the number of feet which the measuring wheel 18 has traversed in units; and the tens of units are shown on number wheel 90. Therefore, the instrument may indicate 99 feet and 11 inches, or any amount thereunder.

The handle 16 is made up of three sections 100, 102 and 104. The sections 102 and 104 are identical in their construction; and the section 100 is an upper terminal section, which includes a gripper portion 106. Each section is an elongated member; and includes an elongated body 108, having a cross as a cross-section. Adjacent to the lower portion of each of the sections of the handle, as viewed in FIG. 4, there is a base 110, with a threaded stud 112 formed integral therewith. The sections 102 and 104 differ from section 100 by virtue of the fact that each of the sections 102 and 104 has an internally-threaded head 114 at its upper end, rather than the gripper portion 106.

The handle 16 may be readily and conveniently assembled by screwing the stud 112 of section 100 into the internally-threaded head 114 of section 102. The stud 112 of section 102 is screwed into head 114 of section 104 to provide a straight elongated handle. The handle is attached to the housing by screwing the stud 112 into the nut 14. The nut is held in the recess 36 by virtue of the fact that the recess 36 conforms to the outer configuration of the nut. The stud 112 fits into the aperture 38 for engagement with the nut; and as the stud is threaded into the nut, the nut is drawn up against the interior of the recess. The end of base 110 is positioned in the handle recess 50. The end abuts against the housing, so that the handle and nut are jammed against the housing to fasten securely the handle to the housing.

It may be seen that the handle, when attached to the nut 14, is held at an angle of approximately 125° relative to the top 40. Thus, when the top 40 is parallel to the surface which is to be measured, the handle forms an angle of 55° with the surface.

The instant measuring device is used for measuring along surfaces which are below or above the operation. The length of the handle 16 is a length convenient for a person standing erect to hold the handle and roll wheel 18 along a floor or other supporting surface. Thus, the operator need not bend over to make a measurement.

There are instances when the wheel cannot be placed at the beginning or the end of the measurement, such as at a corner. Since the distance from the center of the wheel to either end of the bottom is exactly one inch, the operator need only add one inch to the measurement. If the measurement either commenced or ended at a point where the edge abutted a surface, or in the case where both beginning and end abutted a surface, the operator need only add two inches.

Once the measurement has been made and appropriately noted, the operator need only push the reset button 98 to set the number wheels back to zero; and the instrument is ready to make another measurement. In the event that the operator wishes to store the instrument, he need only unscrew the handle from the nut 14 and unscrew the sections from each other, so that the instrument may be conveniently stored.

The construction of the present device is quite simple and highly reliable. The axle for the measuring wheel is held between the front and back halves of the housing. The wheel itself is connected to the axle and is held in position by the housing. The transfer wheel is rotatably mounted on the shaft 34 and is held in position by the measuring wheel and the bevel gear 80, which in turn is held to the counter. Thus, the assembly of the present instrument is simple; and it is easy to manufacture.

Although a specific embodiment of the herein-disclosed invention has been described in detail and has been described in terms of a device for measuring in feet and inches, it is readily apparent that other units, such as those of the metric system, may be used. It is also readily apparent that those skilled in the art may make various modifications and changes in the present construction without departing from the spirit and scope of the present invention. Therefore, the present invention is limited only by the appended claims.

What is claimed is:

1. A portable instrument for measuring linear distance on a surface and providing visible indication of measured distance comprising, a housing made up of two separate substantially identical halves, a fastener connected to said housing, said fastener being adapted to be releasably connected to an elongated handle, each of said halves having a recess for receipt of the fastener, each of said halves having a portion of an aperture for receipt of a portion of a handle adapted to be connected to the fastener, a counter mounted in said housing and having a portion visible for visible indication of measured distance, a wheel rotatably mounted in said housing, said wheel having a portion of its outer periphery extending outside of said housing for engaging the surface upon which linear distance is to be measured, and a drive interconnecting the wheel and the counter to cause rotation of the wheel to drive the counter, said drive and said counter being calibrated to the length of the circumference of the wheel for the counter to indicate distance traveled by the housing.

2. A portable instrument for measuring linear distance on a surface and providing visible indication of measured distance comprising, a housing, a fastener connected to said housing, said fastener is an internally-threaded nut, said fastener being adapted to be releasably connected to an elongated handle, said housing is made up of two separate halves, each of said halves having a recess for mateably receiving one half of the nut for securely holding the nut within the housing, each of said halves having a portion of an aperture for receipt of a portion of a handle adapted to be threadedly connected to the nut for manipulating the portable instrument, a counter mounted in said housing and having a portion visible for visible indication of measured distance, a wheel rotatably mounted in said housing, said wheel having a portion of its outer periphery extending outside of said housing for engaging the surface upon which linear distance is to be measured, and a drive interconnecting the wheel and the counter to cause rotation of the wheel to drive the counter, said drive and said counter being calibrated to the length of the circumference of the wheel for the counter to indicate distance traveled by the housing.

3. A portable instrument for measuring linear distance on a surface and providing visible indication of measured distance comprising, a housing having a pair of molded halves, said housing has a top with a window aperture formed therein, a window mounted in the window aperture, a fastener connected to said housing, said fastener being adapted to be releasably connected to an elongated handle, a counter mounted in said housing and having a portion visible for visible indication of measured distance, said counter being a wheel counter and being positioned adjacent to the window, said counter having a reset button protruding through the top of said housing, said counter having a drive shaft, a molded bevel gear mounted on the drive shaft, a wheel rotatably mounted in said housing, said wheel having a portion of its outer periphery extending outside of said housing for engaging the surface upon which linear distance is to be measured, a drive interconnecting the wheel and the counter to cause rotation of the wheel to drive the counter, said drive and said counter being calibrated to the length of the circumference of the wheel for the counter to indicate distance traveled by the housing, said drive including a unitary molded transfer gear member comprising a second bevel gear at one end and a spur gear at the other end with a disc member of greater diameter than said gears therebetween, said transfer gear member being rotatably mounted on a gear shaft formed integral with one of the halves of the housing with said second bevel gear meshing with the first-mentioned bevel gear, said wheel being molded and having a second spur gear molded integral therewith meshing with the first-mentioned spur gear, and said disc member being so dimensioned and so positioned as to abut said second spur gear to prevent shifting of said transfer gear member in a direction preventing disengagement of said first and second bevel gears.

4. A portable instrument for measuring linear distance on a surface and providing visible indication of measured distance comprising, a housing, a fastener connected to said housing, said fastener being adapted to be releasably connected to an elongated handle, said fastener being an internally-threaded nut, said housing includes a recess conforming to the shape of said nut receiving and lockably holding said nut, said housing having a handle aperture opening into the recess, said housing has a pair of molded halves, a gear shaft formed integral with one of the halves of the housing, said housing has a top adapted for being substantially parallel to the surface upon which linear distance is to be measured, said top has a window aperture formed therein, a window mounted in the window aperture, a counter mounted in said housing and having a portion visible for visible indication of measured distance, said counter being a wheel counter and being positioned adjacent to the window, said counter having a reset button protruding through said top, said counter having a drive shaft, a molded bevel gear mounted on the drive shaft, a wheel rotatably mounted in said housing, said wheel having a portion of its outer periphery extending outside of said housing for engaging the surface upon which linear distance is to be measured, a drive interconnecting the wheel and the counter to cause rotation of the wheel to drive the counter, said drive and said counter being calibrated to the length of the circumference of the wheel for the counter to indicate distance traveled by the housing, said drive including a unitary molded transfer gear member comprising a second bevel gear at one end and a spur gear at the other end with a disc member of a greater diameter than said gears therebetween, said transfer gear member being rotatably mounted on the gear shaft with said second bevel gear meshing with the first-mentioned bevel gear, said wheel being molded and having a second spur gear molded integral therewith meshing with the first-mentioned spur gear, said disc member being so dimensioned and so positioned as to abut said second spur gear to prevent shifting of said transfer gear member preventing disengagement of said first and second bevel gears, and a handle removably positioned in the handle aperture and threadedly connected to the nut for manipulating the portable instrument, said handle being made of a plurality of sections for selectively collapsing the handle.

* * * * *

UNITED STATES PATENT OFFICE
CERTIFICATE OF CORRECTION

Patent No. 3,835,543     Dated September 17, 1974

Inventor(s) Nicholas G. Polydoris and Burnell J. Wollar

It is certified that error appears in the above-identified patent and that said Letters Patent are hereby corrected as shown below:

Column 4, Line 38, "operation" should be --operator--.

Signed and sealed this 3rd day of December 1974.

(SEAL)
Attest:

McCOY M. GIBSON JR.
Attesting Officer

C. MARSHALL DANN
Commissioner of Patents